United States Patent
Kojima

(10) Patent No.: US 7,461,713 B2
(45) Date of Patent: Dec. 9, 2008

(54) TIRE PROTECTING APPARATUS

(75) Inventor: Hiroyoshi Kojima, Nishio (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 238 days.

(21) Appl. No.: 10/636,615

(22) Filed: Aug. 8, 2003

(65) Prior Publication Data

US 2004/0050151 A1    Mar. 18, 2004

(30) Foreign Application Priority Data

Aug. 28, 2002    (JP) .............................. 2002-248039

(51) Int. Cl.
 *B60K 31/00*    (2006.01)
(52) U.S. Cl. .......................... 180/170; 180/277; 701/93
(58) Field of Classification Search ................ 180/170, 180/178, 179, 271, 274, 275, 277, 279, 282; 340/438, 442, 443, 444; 701/93, 99
See application file for complete search history.

(56) References Cited

U.S. PATENT DOCUMENTS

| 3,889,077 A | * | 6/1975 | Hayashi | 200/61.25 |
| 4,011,919 A | * | 3/1977 | Groeger | 180/190 |
| 4,567,459 A | * | 1/1986 | Folger et al. | 346/58 |
| 4,574,267 A | * | 3/1986 | Jones | 340/443 |
| 5,081,443 A | * | 1/1992 | Breit | 340/426.25 |
| 5,546,308 A | * | 8/1996 | Yamamoto | 701/93 |
| 5,587,698 A | * | 12/1996 | Genna | 340/442 |
| 5,661,651 A | * | 8/1997 | Geschke et al. | 701/88 |
| 5,793,285 A | * | 8/1998 | Wehinger | 340/443 |
| 6,343,635 B1 | * | 2/2002 | Hsu | 152/153 |
| 6,434,470 B1 | * | 8/2002 | Nantz et al. | 701/93 |
| 6,448,891 B2 | * | 9/2002 | Barnett | 340/438 |
| 6,456,922 B1 | * | 9/2002 | Gamberg | 701/71 |
| 6,498,967 B1 | * | 12/2002 | Hopkins et al. | 701/1 |
| 6,671,609 B2 | * | 12/2003 | Nantz et al. | 701/93 |
| 6,741,169 B2 | * | 5/2004 | Magiawala et al. | 340/438 |
| 6,809,637 B1 | * | 10/2004 | Brown | 340/443 |
| 6,888,450 B2 | * | 5/2005 | Sasaki et al. | 340/445 |

FOREIGN PATENT DOCUMENTS

| DE | 198 23 646 A 1 |   | 12/1999 |
| GB | 2 198 552 | * | 6/1988 |
| JP | A-54-13103 |   | 1/1979 |
| JP | A 6-211012 |   | 8/1994 |
| JP | A 9-240446 |   | 9/1997 |
| JP | A 10-244932 |   | 9/1998 |
| JP | U-3059840 |   | 4/1999 |
| JP | A 2000-355203 |   | 12/2000 |
| JP | A 2002-103931 |   | 4/2002 |
| WO | WO 01/03953 A2 |   | 1/2001 |

* cited by examiner

*Primary Examiner*—Christopher Ellis
*Assistant Examiner*—Bridget Avery
(74) *Attorney, Agent, or Firm*—Oliff & Berridge, plc

(57) ABSTRACT

A tire protecting apparatus mounted on a vehicle provided with a wheel having a tire on a wheel filled with pressurized air, which protects the tire from abnormally deforming while the vehicle is running, is provided with a tire temperature sensor that detects a temperature of the tire, and a determinator that determines whether it is necessary to cool the tire based on the tire temperature detected by the tire temperature sensor when there is a possibility that abnormal tire deformation will occur. Accordingly, the invention protects the tire from abnormally deforming by considering the temperature of the tire while the vehicle is running.

23 Claims, 14 Drawing Sheets

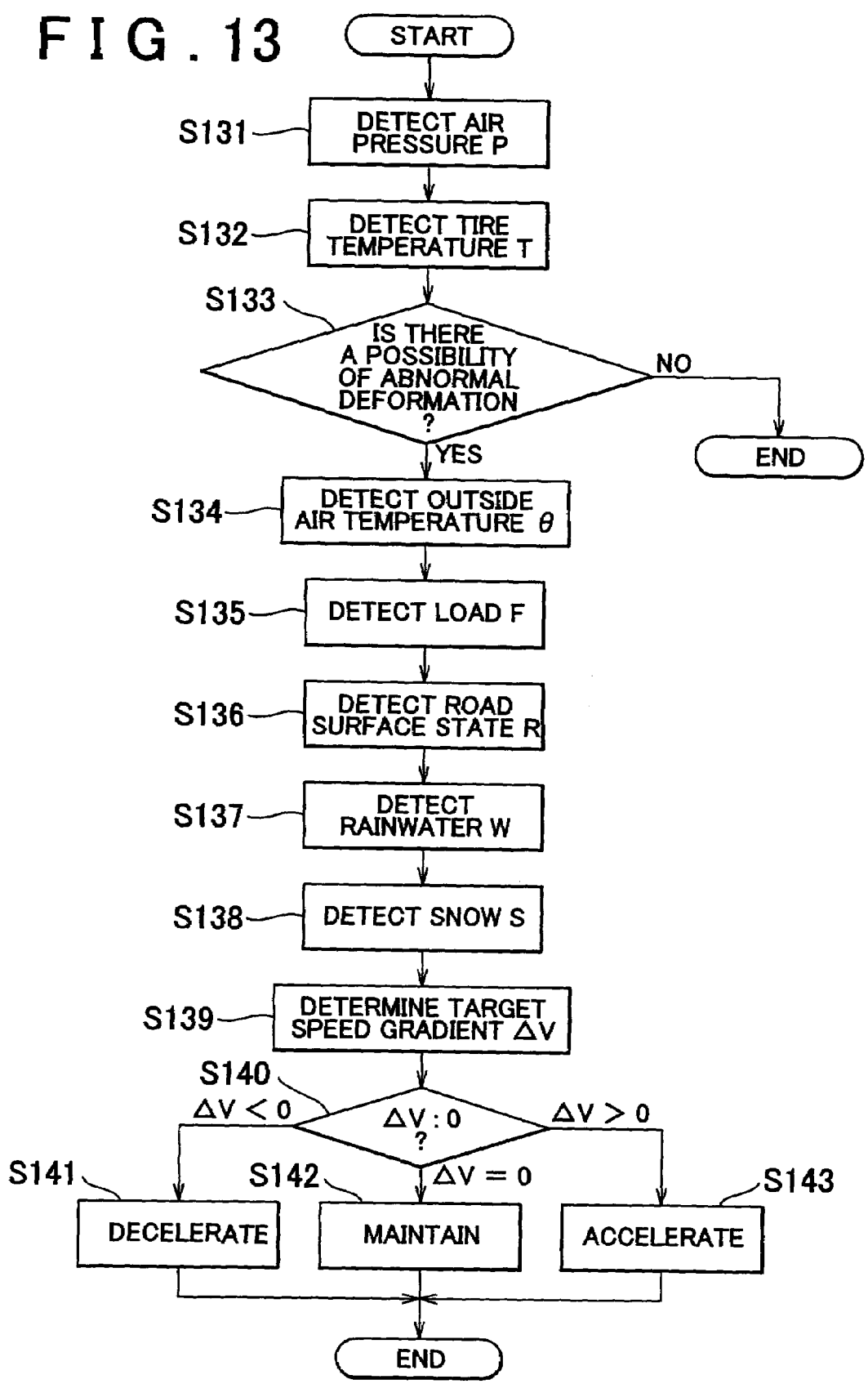

TIRE PROTECTING APPARATUS

INCORPORATION BY REFERENCE

The disclosure of Japanese Patent Application No. 2002-248039 filed on Aug. 28, 2002, including the specification, drawings and abstract is incorporated herein by reference in its entirety.

BACKGROUND OF THE INVENTION

1. Field of the Invention

The invention relates to the improvement of art which protects a tire of a vehicle from deforming abnormally while the vehicle is running.

2. Description of the Related Art

While a vehicle is running, there is a possibility that a tire of the vehicle will deform abnormally. This abnormal deformation could be due to not only the state of the tire itself (e.g., air pressure in the tire), but may also be due to the running state of the vehicle (including the rotating state of the tire, the driving environment of the vehicle, and the like).

Therefore, it is desirable to monitor the tire of the vehicle while running. Further, it is also desirable to prevent the tire from deforming abnormally while the vehicle is running.

JPA 6-211012 discloses one example of art proposed to fulfill these kinds of needs. This related art predicts that a tire will deform abnormally based on the air pressure and temperature of the tire, and then prevents the tire from abnormally deforming by automatically decelerating the vehicle when it has been predicted that abnormal deformation will occur.

The inventor has conducted a simulation test in which the phenomenon occurring in the tire while the vehicle is running was reproduced. This test was carried out on a plurality of tires, each having different characteristics. During the test, the temperature of each tire was successively measured.

From the test, the inventor was able to see a trend in which abnormal deformation of the tire only occurred when the temperature of the tire was above a predetermined value. Based on that knowledge, the inventor learned that controlling the temperature of the tire is important for preventing abnormal deformation of the tire.

During running of the vehicle, the tire is both heated and cooled simultaneously. That is, the tire is heated by repeatedly deforming, as well as by the air outside of the vehicle, and the like. On the other hand, the tire is cooled by the flow of air moving around the tire as the vehicle runs, and the like. The tire temperature is therefore determined by the balance of these heating and cooling effects, i.e., the heat balance. On the other hand, the cooling effect of the tire from wind while the vehicle is running increases as the vehicle speed increases.

With respect to this, the foregoing related art focuses on the relationship between the tire load and the abnormal deformation, in which the tendency for abnormal tire deformation to decrease as the tire load is reduced increases, and reduces the tire load by automatically decelerating the vehicle when there is a possibility of abnormal tire deformation occurring.

As is evident from the above description, however, decelerating the vehicle reduces the cooling effect on the tire from the wind while the vehicle is running.

Therefore, based on the knowledge that it is important to control the temperature of the tire in order to prevent the tire from abnormally deforming, as mentioned above, it is important to monitor the state of the tire in terms of at least the tire temperature and/or a change in that temperature when there is a possibility of abnormal tire deformation occurring.

SUMMARY OF THE INVENTION

In view of the foregoing knowledge, the invention thus provides art to prevent abnormal tire deformation by taking into consideration the temperature of the tire while the vehicle is running.

A first exemplary embodiment of the invention relates to a tire protecting apparatus mounted on a vehicle provided with a wheel having a tire filled with pressurized air, which protects the tire from abnormally deforming while the vehicle is running. This tire protecting apparatus is provided with a tire temperature sensor and a determinator. The tire temperature sensor detects a temperature of the tire. The determinator determines whether it is necessary for the tire to be cooled based on the tire temperature detected by the tire temperature sensor when there is a possibility of the tire abnormally deforming.

According to the apparatus of the above construction, it is determined whether it is necessary to cool the tire based on the tire temperature when there is a possibility of the tire abnormally deforming.

Accordingly, with the apparatus it is possible to prevent abnormal tire deformation from occurring by taking into consideration the tire temperature using the determination results.

The temperature sensor in this specification may be a direct detection type sensor that directly detects the temperature of the tire, or an indirect detection type sensor that estimates (i.e., indirectly detects) the temperature of the tire based on a running history (relating to the running speed, running time and the like) of the vehicle.

The direct detection type temperature sensor can be mounted to the tire itself or to a portion of the vehicle body that is close to the tire. This type of temperature sensor can be a contact type sensor that detects the tire temperature by contact with the tire, or a non-contact type sensor that detects the surface temperature of the tire by detecting electromagnetic waves (e.g., infrared rays) given off by the surface of the tire.

On the other hand, the indirect detection type temperature sensor can be configured so as to estimate the tire temperature based on the running history and other factors that may increase the tire temperature (e.g., the air temperature outside the vehicle).

Another aspect of the invention relates to a tire protecting apparatus mounted on a vehicle provided with a wheel having a tire filled with pressurized air, which protects the tire from abnormally deforming while the vehicle is running. The apparatus according to this aspect of the invention includes a tire temperature sensor that detects a temperature of the tire, and a vehicle speed control unit which controls the vehicle speed based on the tire temperature detected by the tire temperature sensor when there is a possibility of abnormal tire deformation occurring.

This construction, as compared with a construction in which the vehicle speed is controlled without considering the actual temperature of the tire when there is a possibility of abnormal tire deformation occurring, makes it easier to prevent abnormal tire deformation from occurring.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 13 is a flowchart schematically showing the content of the tire protecting program executed by the computer 70 of the tire protecting apparatus according to the third exemplary embodiment of the invention.

DETAILED DESCRIPTION OF THE EXEMPLARY EMBODIMENTS

In the following description and the accompanying drawings, the present invention will be described in more detail in terms of exemplary embodiments.

Figure 1:
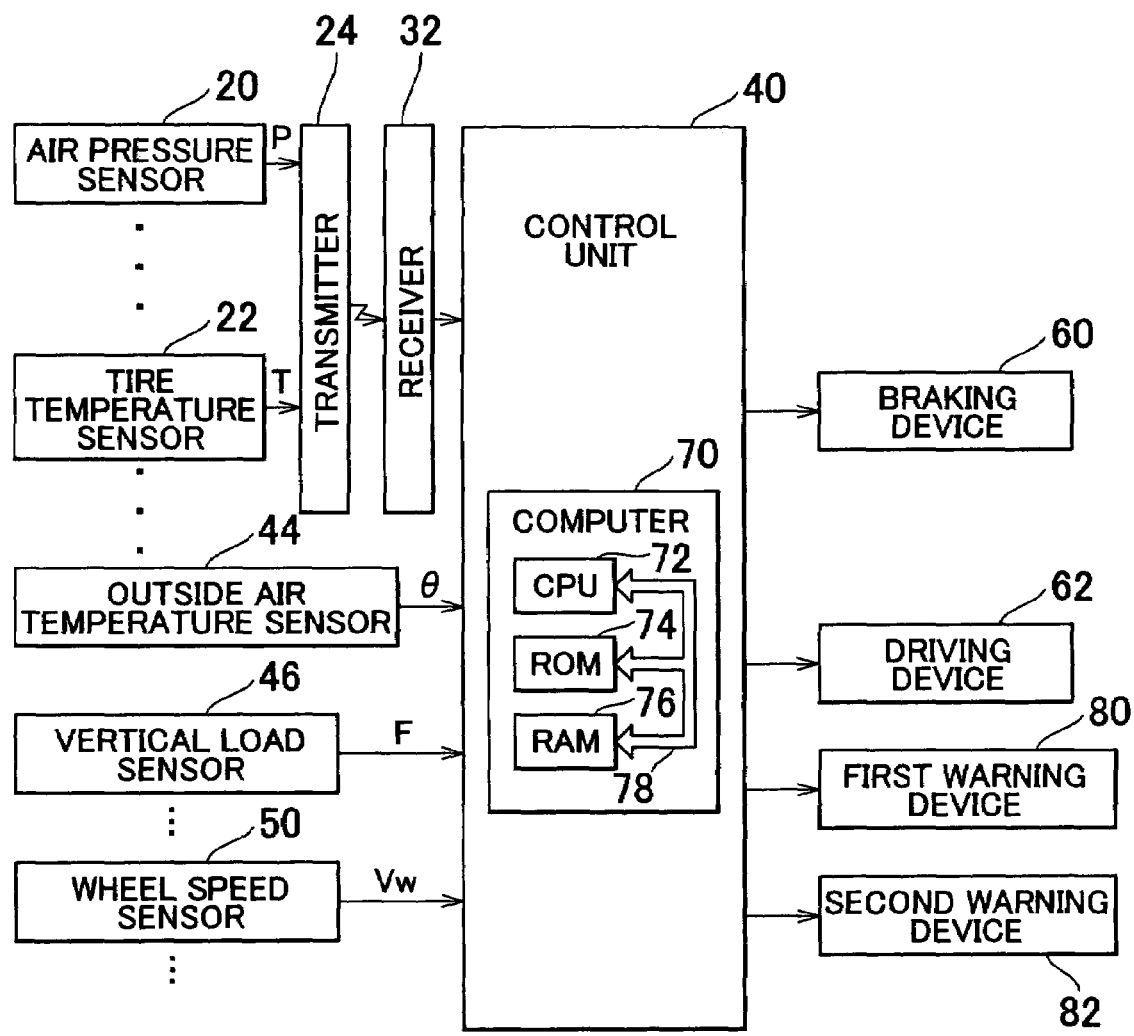
FIG. 1 is a block diagram showing a hardware configuration of a tire protecting apparatus according to a first exemplary embodiment of the invention.
Figure 2:
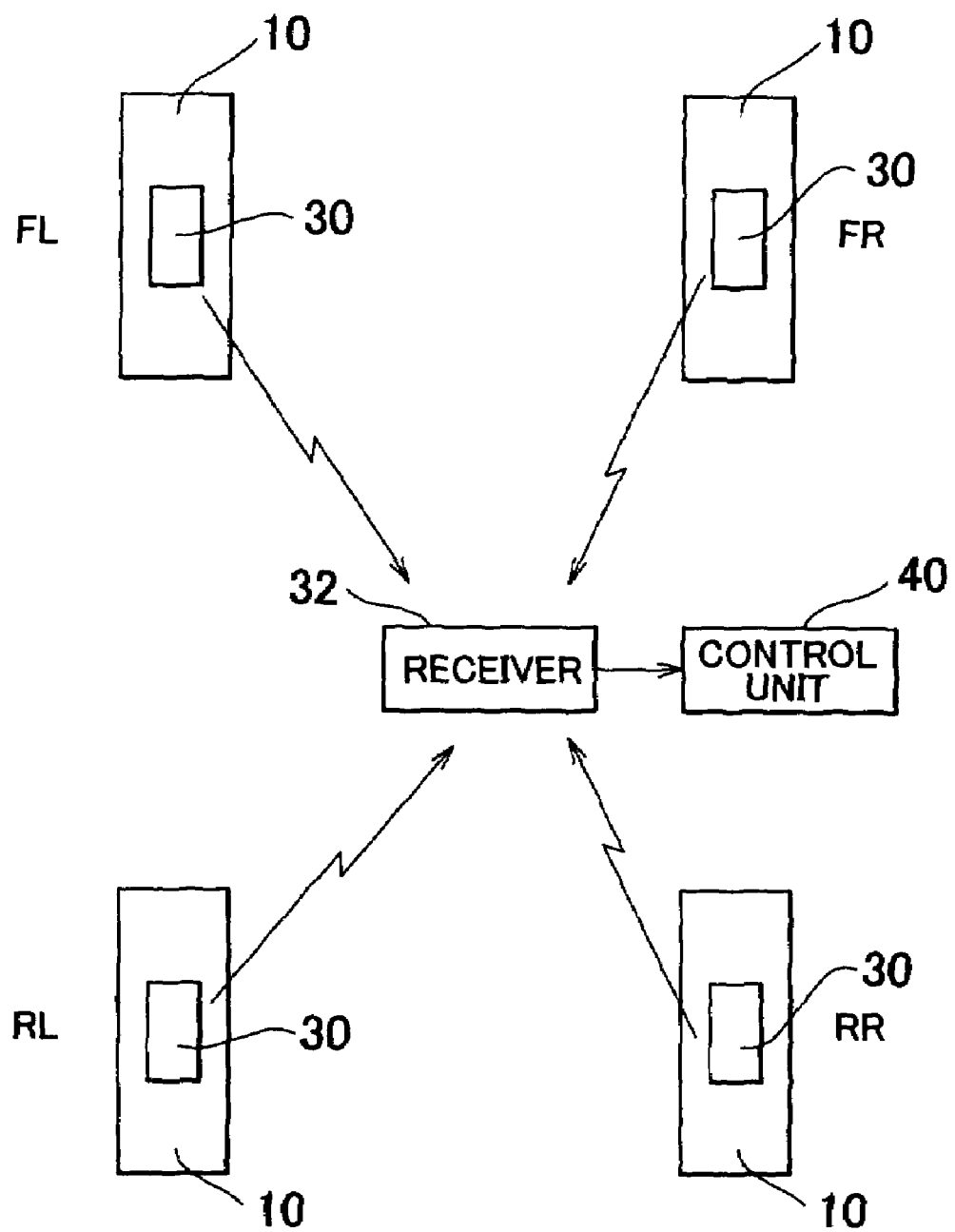
FIG. 2 is a plan view showing a plurality of wheels 10 in which the tire protecting apparatus shown in FIG. 1 is mounted, and an in-tire sensor unit 30 arranged within each wheel 10.

FIG. 1 is a block diagram schematically showing the hardware configuration of a tire protecting apparatus according to a first exemplary embodiment of the invention. This tire protecting apparatus is mounted in a vehicle which has wheels 10 provided at the front and rear left and right thereof, as shown in FIG. 2. In the drawing, reference character "FL" refers to the front left wheel, "FR" refers to the front right wheel, "RL" refers to the rear left wheel, and "RR" refers to the rear right wheel.

As is well known, each wheel 10 has a rubber tire filled with pressurized air mounted on a metal wheel. The tire protecting apparatus is provided with an air pressure sensor 20 and a tire temperature sensor 22 for each wheel 10, as shown in FIG. 1. The air pressure sensor 20 is a sensor which directly detects an air pressure P of the tire. Similarly, the tire temperature sensor 22 is a sensor which directly detects a temperature T of the tire.

Figure 3:
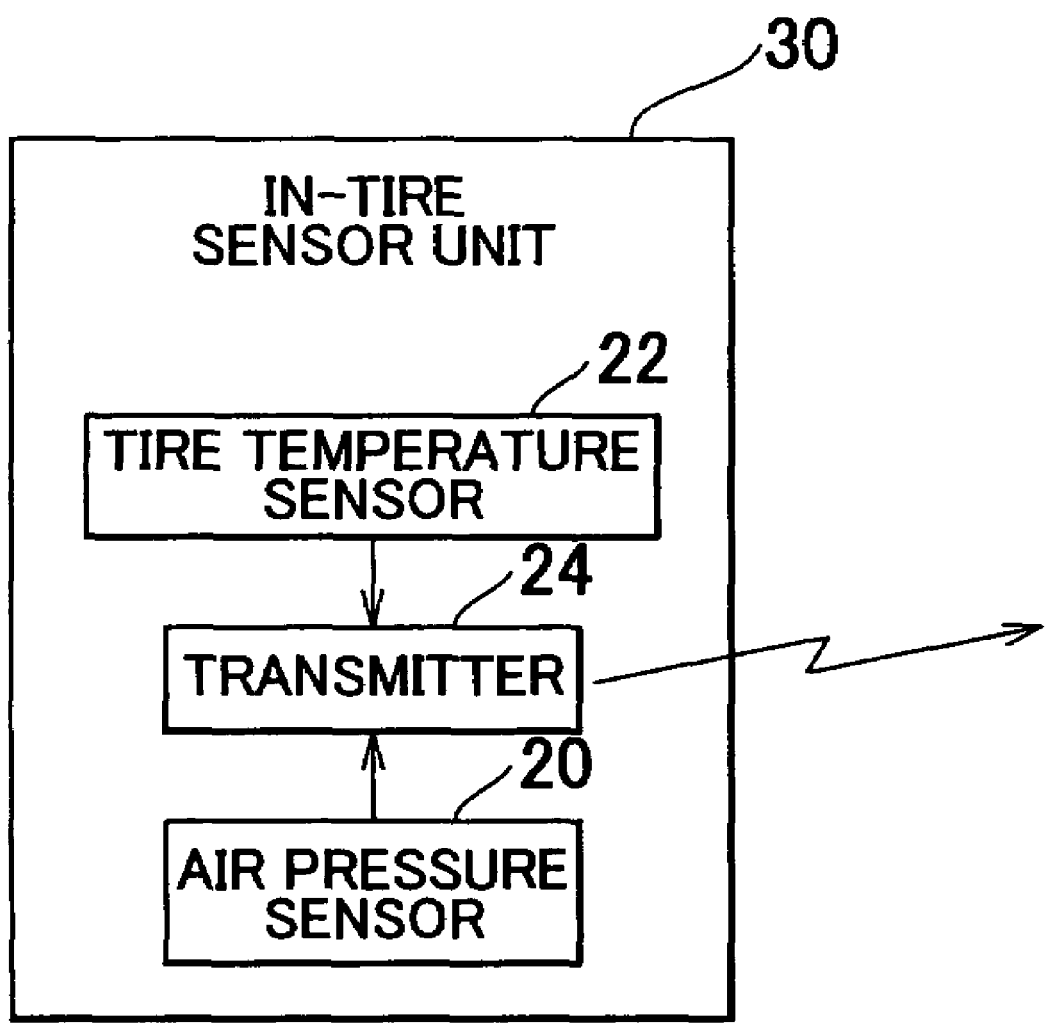
FIG. 3 is a block diagram showing the in-tire sensor unit 30 in FIG. 2.

The air pressure sensor 20 and the tire temperature sensor 22, together with a transmitter 24, make up an in-tire sensor unit 30, as shown in FIG. 3. This in-tire sensor unit 30 is mounted inside of the tire on each wheel 10, as shown in FIG. 2.

The tire protecting apparatus is provided with a receiver 32 on the vehicle body side, as shown in FIG. 2. This receiver 32 receives signals indicative of the air pressure P and the tire temperature T that are sent from the transmitter 24 in each wheel 10 via wireless transmission. The receiver 32 then sends the received signals on to a control unit 40.

As shown in FIG. 1, the tire protecting apparatus also has an outside air temperature sensor 44 and a vertical load sensor 46. The outside air temperature sensor 44 is a sensor that detects a vehicle outside air temperature θ. The vertical load sensor 46, which is provided in each wheel 10, is a sensor that detects a vertical load F acting on the wheel 10. The outside air temperature sensor 44 and the vertical load sensor 46 are both electrically connected to the control unit 40.

In addition, the vertical load sensor 46 can be substituted by a sensor that detects a physical quantity corresponding to the vertical load F. This sensor may be a vertical acceleration sensor which detects a vertical acceleration of a spring upper member or a spring lower member of the vehicle for each wheel 10, or a displacement sensor which detects a displacement of the spring upper member with respect to the spring lower member, or the like.

As shown in FIG. 1, the tire protecting apparatus further includes a wheel speed sensor 50 for each wheel 10. As is well known, each wheel speed sensor 50 is a sensor that detects an angular speed of the respective wheel 10 as a wheel speed Vw. More specifically, the wheel speed sensor 50 is an electromagnetic pick-up which outputs a voltage signal that changes cyclically as multiple teeth, which are formed on the outer periphery of a rotor that rotates together with the wheel 10, pass by. The wheel speed sensor 50 is also electrically connected to the control unit 40.

According to this exemplary embodiment, the wheel speed sensor 50 is provided for the purpose of estimating the roughness of the road surface with which the wheel 10 is in contact, as well as for the purpose of estimating the vehicle speed V. It is possible, however, to use the wheel speed sensor 50 to estimate the tire air pressure P of the wheel 10, in which case the air pressure sensor 20 may be omitted.

It is also possible to use the wheel speed sensor 50 to estimate the tire temperature T of the wheel 10. In this case, because it is possible to understand the constant relationship between the running history and the temperature T of each wheel 10, the tire temperature sensor 22 can be omitted.

As shown in FIG. 1, a braking device 60 and a driving device 62 of the vehicle are also electrically connected to the control unit 40. The braking device 60 electrically controls the braking force of each wheel 10 regardless of whether a pressure medium is used. This braking force may be controlled by controlling a brake provided for each wheel 10, or by controlling the operational effect of a pumping action by the vehicle power source, i.e., the engine, as an engine brake.

Therefore, the braking device 60 uses an electromagnetic valve or an electric motor for braking, and an electromagnetic valve or an electric motor for controlling the opening amount of a throttle valve of the engine, as an actuator.

In contrast, the driving device 62 electrically controls the driving force of the wheel 10. This driving force may be controlled by controlling the engine, or by controlling either a stepped or variable speed transmission which transmits output from the engine to the wheel 10.

Therefore, this driving device 62 uses an electromagnetic valve or an electric motor for controlling the opening amount of the throttle valve of the engine, and an electromagnetic valve or an electric motor for the transmission, as an actuator.

The control unit 40 has a computer 70 as its main component and controls the running state of the vehicle via the braking device 60 or the driving device 62 based on the signals output from the various sensors connected to the control unit 40 by executing the necessary program using the computer 70 so as to protect the tire from abnormally deforming. More specifically, this control unit 40 controls the vehicle speed as the running state of the vehicle.

As shown in FIG. 1, the computer 70 includes a CPU 72 (one example of a processor), ROM 74 (one example of memory), and RAM 76 (another example of memory) all connected together via a bus 78.

As shown in FIG. 1, a first warning device 80 and a second warning device 82 are also connected to the control unit 40. This first warning device 80 is activated when there is a possibility of abnormal tire deformation occurring in at least one of the plurality of wheels 10, and visually (i.e., by display) or audibly (i.e., by sound) notifies a user (including a driver) of the vehicle of that possibility.

On the other hand, the second warning device 82 is activated when it is necessary to cool the tire in order to prevent abnormal tire deformation occurring in at least one of the plurality of wheels 10, and visually (i.e., by display) or audibly (i.e., by sound) notifies the user of the vehicle of that necessity.

The first warning device 80 and the second warning device 82 may also visually or audibly notify the user of the vehicle when the tire temperature is high or when the tire pressure is low, or the like, in addition to when there is a possibility of abnormal tire deformation or when it is necessary to cool the tire. Furthermore, the display or noise may be different depending on the degree of abnormal tire deformation, or the level of the tire temperature or pressure.

Figure 4:
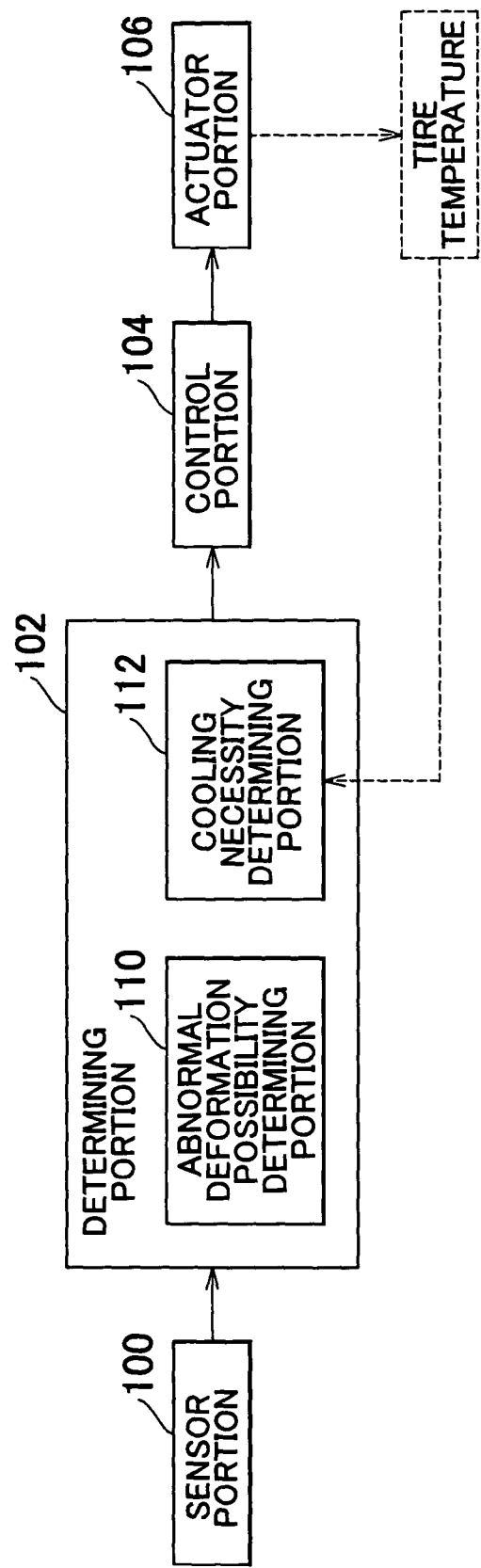
FIG. 4 is a functional block diagram showing the tire protecting apparatus in FIG. 1.

FIG. 4 is a functional block diagram schematically showing the tire protecting apparatus. When considering the tire protecting apparatus in terms of each function that it performs, the tire protecting apparatus can be divided into four portions: a sensor portion 100, a detecting portion 102, a control portion 104, and an actuator portion 106. The sensor portion 100 includes the air pressure sensor 20, the tire temperature sensor 22, the outside air temperature sensor 44, the vertical load sensor 46, and the wheel speed sensor 50.

The actuator portion 106 includes the aforementioned electric motor and electromagnetic valve and the like. The control portion 104 comprises portions of the braking device 60 and the driving device 62 that control the respective actuators therein.

The detecting portion 102 includes an abnormal deformation possibility determining portion 110 that determines whether there is a possibility of abnormal tire deformation for each tire by determining whether the tire temperature is over a threshold value TB (one example of the critical temperature). Here, the threshold value TB is, for example, obtained beforehand for each type of tire by testing or the like as a critical temperature that the tire temperature should not exceed in order to prevent abnormal tire deformation.

The detecting portion 102 further includes a cooling necessary determining portion 112 that determines whether it is necessary to cool the tire by determining whether the tire temperature has exceeded a target temperature Tt (one example of the reference temperature). The detecting portion 102 comprises the control unit 40.

In this exemplary embodiment, when it is determined that there is a possibility of abnormal tire deformation, the automatic braking control starts so as to automatically decelerate the vehicle. Also, according to this exemplary embodiment, when it has been determined that there is a possibility of abnormal tire deformation, automatic braking is performed until the vehicle stops.

Further in this exemplary embodiment, when it is necessary to cool the tire by the flow of air when the vehicle is running while the automatic braking control is being executed, such that it is determined that it is necessary to cool the tire, deceleration of the vehicle is cancelled by at least one of releasing the braking device 60 and operating the driving device 62.

When it has been determined that it is necessary to cool the tire, the vehicle speed is controlled such that the actual tire temperature T approaches the target temperature Tt. As a result, the actual tire temperature T is controlled so as not to exceed the critical temperature (which matches the threshold temperature TB) that the tire temperature should not exceed in order to prevent abnormal tire deformation.

As can be understood from the above description, in the exemplary embodiment, the actuator portion 106 controls the cooling effect of the tire such that operation of the actuator portion 106 is reflected in the tire temperature T.

The cooling necessary determining portion 112 takes the tire temperature T into account when making a determination. The control portion 104 then controls the actuator portion 106 in a way that reflects the determination results by the cooling necessary determining portion 112. Accordingly, the actuator portion 106 controls the vehicle speed by successively feeding back the tire temperature T that reflects the past control results.

Figure 5:
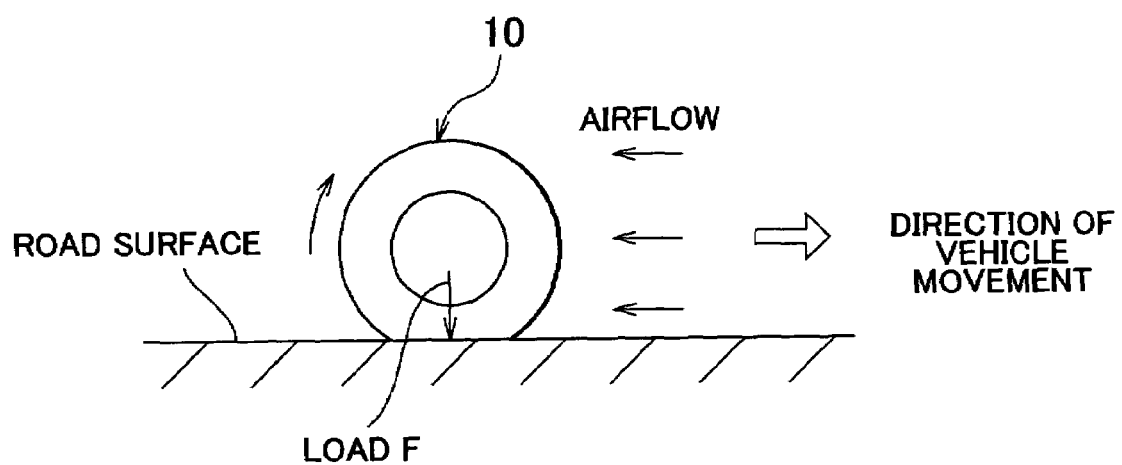
FIG. 5 is a front view schematically showing a mechanism by which the tire protecting apparatus in FIG. 1 protects the tire.

FIG. 5 schematically shows the heating and cooling factors of the tire. In this exemplary embodiment, the vehicle outside air temperature $\theta$, the vertical load on the tire (hereinafter, simply referred to as "load F"), and the severity of the roughness of the road surface (the road surface is regarded as the source of excitation of the tire) (hereinafter, simply referred to as "roughness R" or "road surface state R") are considered to be heating factors.

Also according to the exemplary embodiment, the wind speed of the air flowing around the tire (which corresponds to the vehicle speed V) is considered to be a cooling factor. In this case, the cooling factor may be considered to be a heat adsorbing element for the tire.

Figure 6:
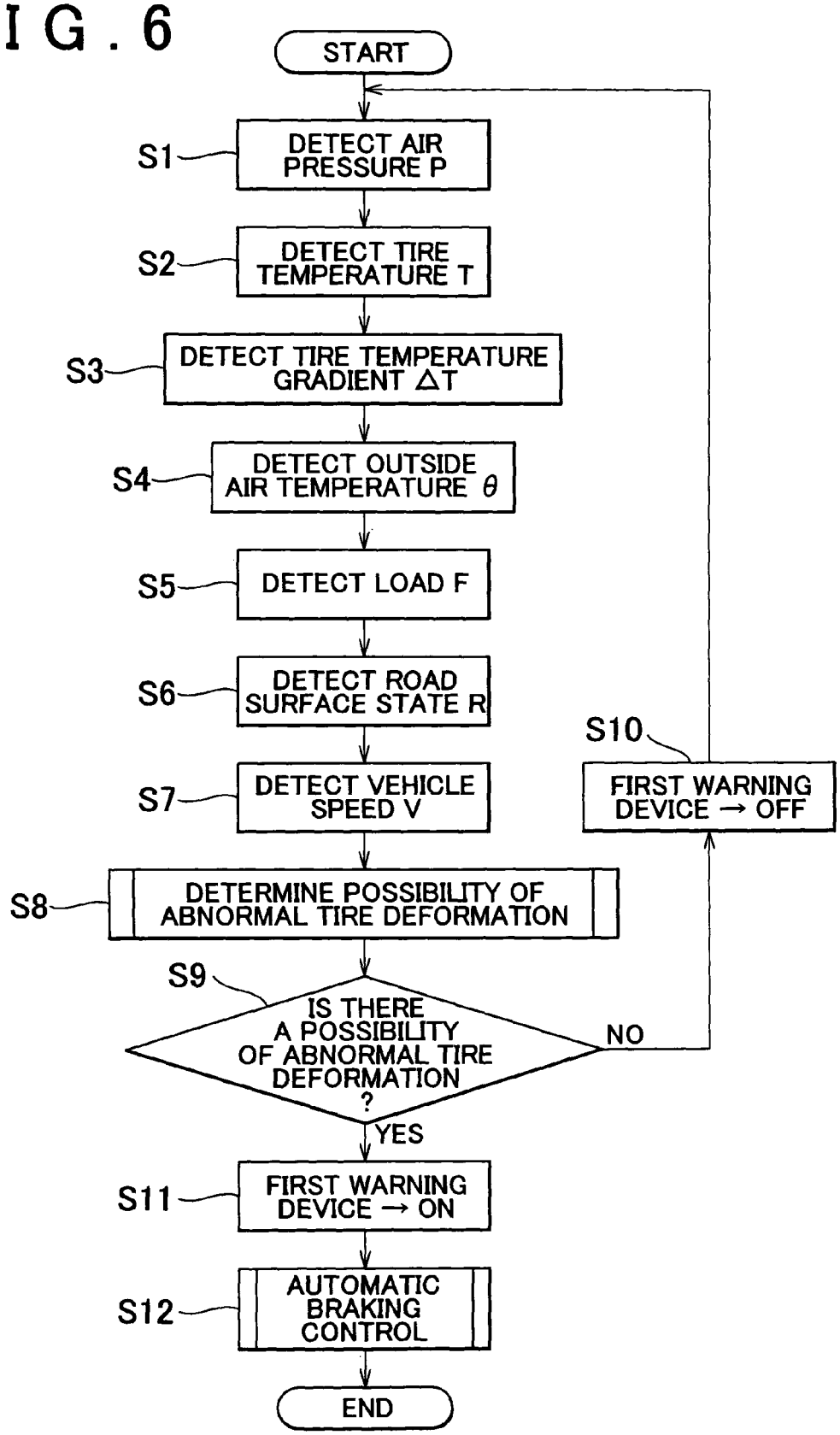
FIG. 6 is a flowchart schematically showing the content of a tire protecting program executed by a computer 70 shown in FIG. 1.

Each type of program, starting with the tire protecting program schematically illustrated in the flowchart in FIG. 6, is stored in advance in the ROM 74. This tire protecting program is repeatedly executed for each wheel 10 in sequence while power is supplied to the computer 70.

Each time the tire protecting program is executed, the air pressure P of the tire of the wheel for which the program is being executed is first detected by the air pressure sensor 20 in step S1. Next in step S2, the tire temperature T of that tire is detected by the tire temperature sensor 22.

Continuing on, in step S3 the difference between the current value of the detected tire temperature T and the last value (stored in the RAM 76) of the tire temperature T is detected as a tire temperature gradient $\Delta T$. Then in step S4, the outside air temperature $\theta$ is detected by the outside air temperature sensor 44.

Then in step S5, the load F of the tire is detected by the vertical load sensor 46.

In step S6, the roughness R of the road surface at the current point is detected for the tire based on time-series signals output by the wheel speed sensor 50. The road surface state R is a variable that indicates how good or how rough the current road surface is. For example, a road surface such as asphalt that has few irregularities (i.e., is relatively smooth) is determined to be a good road surface while a road surface such as gravel that has many irregularities (i.e., is relatively rough) is determined to be a rough road surface.

In step S7, the vehicle speed V is determined by estimation based on the plurality of wheel speeds Vw detected by the plurality of wheel speed sensors 50.

In step S8, it is determined whether there is a possibility of abnormal tire deformation of the tire using several of the detected physical quantities mentioned above.

Figure 7:
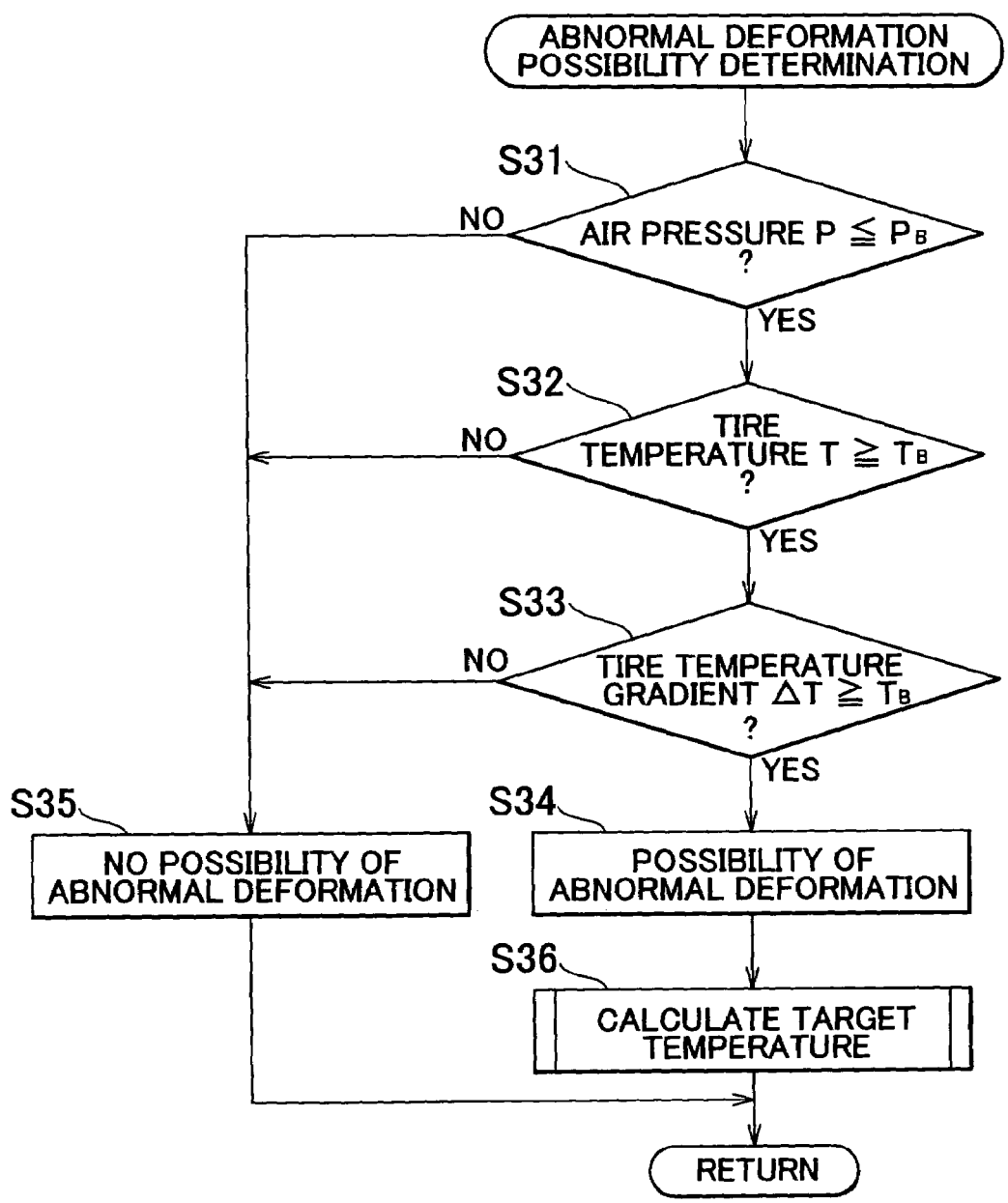
FIG. 7 is a flowchart schematically showing the details of step S8 in FIG. 6 as an abnormal deformation possibility determining routine.

The details of the abnormal deformation possibility determination are schematically illustrated in the flowchart as the abnormal deformation possibility determining routine shown in FIG. 7. In this abnormal deformation possibility determining routine, it is first determined whether the detected air pressure P is equal to, or greater than, the threshold value PB in step S31. If the air pressure P is equal to, or smaller than, the threshold value PB, the determination is YES and the routine continues on to step S32.

In step S32 it is determined whether the detected tire temperature T is equal to, or greater than, the threshold value TB. If the tire temperature T is equal to, or greater than, the threshold value TB, the determination is YES and the routine continues on to step S33.

In step S33 it is determined whether the detected tire temperature gradient $\Delta T$ is equal to, or greater than, the threshold value $\Delta TB$. If the tire temperature gradient $\Delta T$ is equal to, or greater than, the threshold value $\Delta TB$, the determination is YES and the routine continues on to step S34, where it is determined that there is a possibility of abnormal tire deformation for that tire.

In contrast, if the determination in any step from step S31 to step S33 is NO, it is determined in step S35 that there is no possibility of abnormal tire deformation for that tire.

Figure 8:
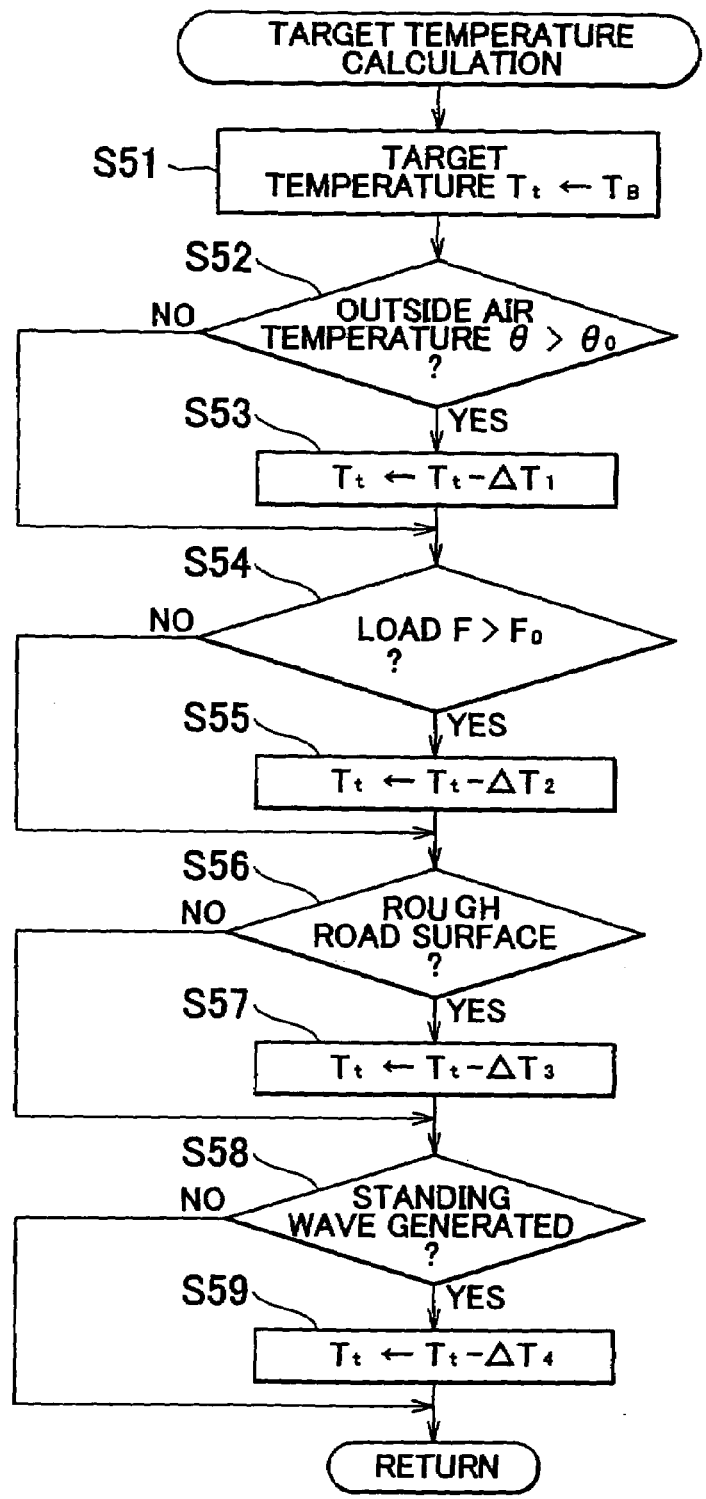
FIG. 8 is a flowchart schematically showing the details of step S36 in FIG. 7 as target temperature calculating routine.

If it is determined in step S34 that there is a possibility of abnormal tire deformation, the target temperature Tt is then calculated in step S36. FIG. 8 shows the details of step S36 schematically illustrated by a flowchart as a target temperature calculating routine. In this target temperature calculating routine, the target temperature Tt is first set temporarily to a value equivalent to the threshold value TB in step S51.

Then in step S52, it is determined whether the detected outside air temperature $\theta$ is higher than a threshold value $\theta 0$, i.e., it is determined whether the outside air is acting as a heating source (i.e., an exciting element) of the tire. If the outside air temperature $\theta$ is higher than the threshold value $\theta 0$, then the determination in step S52 is YES and the routine proceeds on to step S53, where the target temperature Tt is corrected by subtracting a correction quantity $\Delta T1$ from the current value of the target temperature Tt. If the outside air temperature $\theta$ is not higher than the threshold value $\theta 0$, step S53 is skipped.

In addition, the target temperature Tt can be corrected by multiplying the current value of the target temperature Tt by a correction coefficient that is less than one.

Then it is determined whether the detected load F is greater than a threshold value F0 in step S54. If the load F is greater than the threshold value F0, the determination is YES and the routine proceeds on to step S55, where the target temperature Tt is corrected by subtracting a correction quantity $\Delta T2$ from the current value of the target temperature Tt. If the load F is not higher than the threshold value F0, step S55 is skipped.

Then in step S56 it is determined whether the detected roughness R is indicative of a rough road surface. If the roughness R indicates that the present road surface is rough, the determination is YES and the routine proceeds on to step S57, where the target temperature Tt is corrected by subtracting a correction quantity $\Delta T3$ from the current value of the target temperature Tt. If the roughness R does not indicate that the present road surface is rough, step S57 is skipped.

Then in step S58, it is determined whether a standing wave phenomenon is occurring in the tire based on the detected air pressure P and the detected vehicle speed V. For example, when the air pressure P is below the threshold value and the vehicle speed V is over the threshold value, it is determined that the standing wave phenomenon is occurring in the tire.

If the standing wave phenomenon is occurring in the tire, the determination in step S58 is YES and the routine proceeds on to step S59, where the target temperature Tt is corrected by subtracting a correction quantity $\Delta T4$ from the current value of the target temperature Tt. On the other hand, if the standing wave phenomenon is not occurring, step S59 is skipped.

This completes one execution of the target temperature calculating routine. One execution of the abnormal deformation possibility determination routine shown in FIG. 7 is also completed at same time.

It is then determined in step S9 in FIG. 6 whether, when S8 was executed last, it was determined that there is a possibility of an abnormal tire deformation. If, when step S8 was executed last, it was determined that there is not a possibility of abnormal tire deformation, then the determination in step S9 is NO and the routine proceeds on to step S10, where a signal is output to the first warning device 80 to turn that device OFF. The routine then returns to step S1 again.

In contrast, if, when step S8 was executed last, it was determined that there is a possibility of abnormal tire deformation, the determination in step S9 is YES and the routine proceeds on to step S11, where a signal is output to the first warning device 80 to turn that device ON. As a result, the user of the vehicle is then notified that there is a possibility of abnormal tire deformation.

Figure 9:
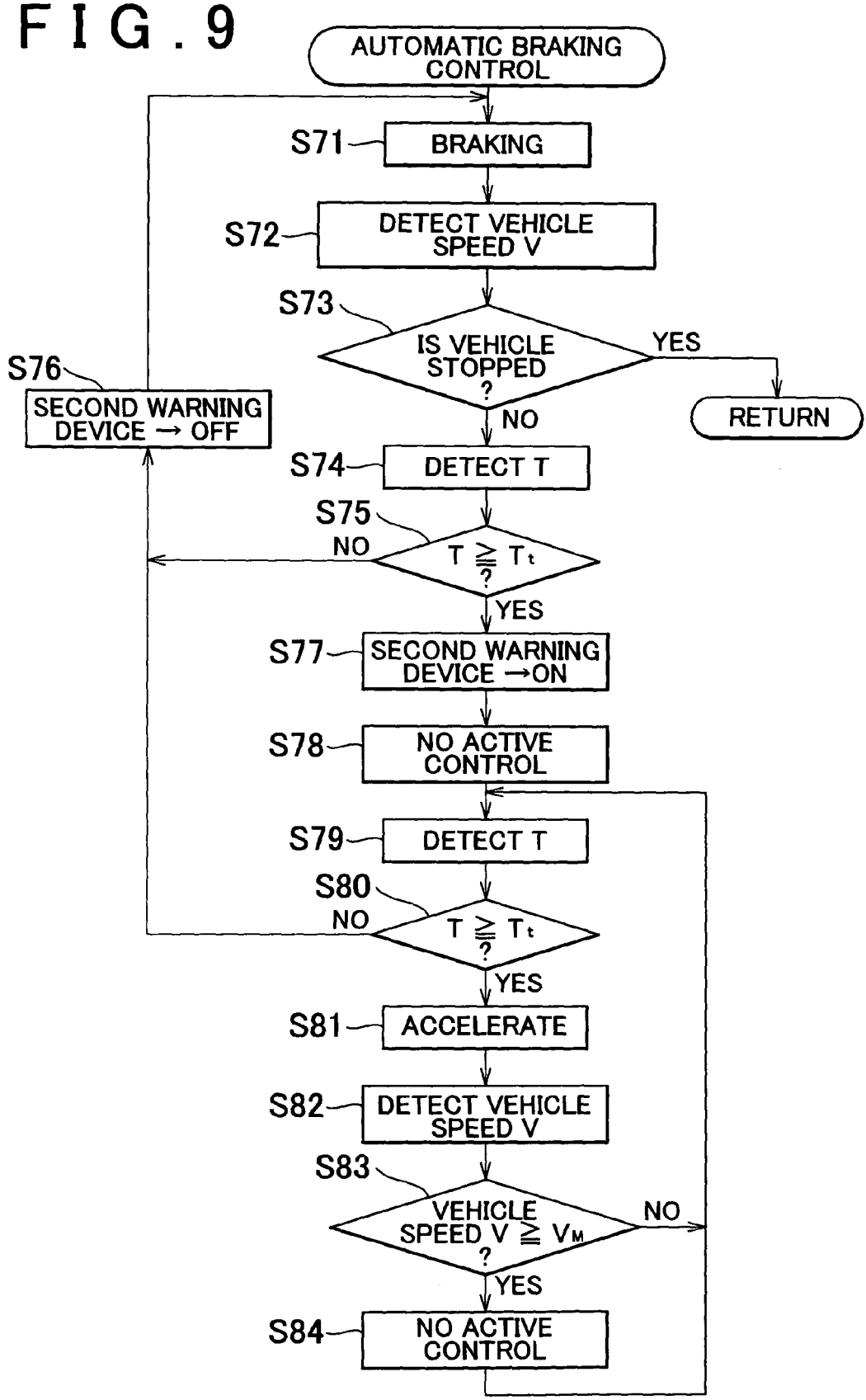
FIG. 9 is a flowchart schematically showing the details of step S12 in FIG. 6 as an automatic braking control routine.

Then in step S12 the automatic braking control is executed. FIG. 9 schematically illustrates the details of step S12 with a flowchart as an automatic braking control routine. In this automatic braking control routine, vehicle braking is first performed at a set speed gradient (set deceleration rate) by operation of the braking device 60 in step S71. Next, in step S72, the vehicle speed V is detected as described above. Then in step S73 it is determined whether the vehicle has stopped based on the detected vehicle speed V. If the vehicle has stopped, the determination in step S73 is YES and that cycle of the automatic braking control routine immediately ends. If the vehicle has not yet stopped, however, the determination is NO and the routine proceeds on to step S74.

In step S74 the tire temperature T is detected by the tire temperature sensor 22. Then in step S75 it is determined whether the detected tire temperature T is equal to, or greater than, the calculated target temperature Tt, i.e., whether it is necessary to cool the tire. If the tire temperature T is not equal to, or greater than, the target Tt, the determination in step S75 is NO and the routine proceeds on to step S76, where a signal is output to the second warning device 82 to turn that device OFF. The routine then returns to step S71.

On the other hand, if the tire temperature T is equal to, or greater than, the target temperature Tt, the determination in step S75 is YES and the routine proceeds on to step S77, where a signal is output to the second warning device 82 to turn that device ON. As a result, the user of the vehicle is notified of the fact that it is necessary to cool the tire.

Then in step S78 active vehicle control is cancelled, such that the vehicle is in a state in which neither braking nor acceleration (i.e., driving) is performed. This mitigates a decrease in the cooling effect on the tire from the flow of air around it as the vehicle runs.

Then in step S79, the tire temperature T is detected by the tire temperature sensor 22, and in step S80, it is determined whether that detected tire temperature T is equal to, or greater than, the calculated target temperature Tt, i.e., it is determined again whether it is necessary to cool the tire.

If the tire temperature T is not equal to, nor greater than, the target temperature Tt, the determination in step S80 is NO and the routine returns to step S71 after performing step S76. On the other hand, if the tire temperature is equal to, or greater than, the target temperature Tt, the determination in step S80 is YES and the routine proceeds on to step S81, where the vehicle is accelerated according to the set vehicle gradient (set acceleration rate) by operation of the driving device 62. This acceleration actively increases the cooling effect on the tire by the flow of air around it as the vehicle runs.

Then in step S82, the vehicle speed V is detected and in step S83 it is determined whether that detected vehicle speed V is equal to, or greater than, an upper limit vehicle speed VM (e.g., the vehicle speed V at the start of the current automatic braking control). If the vehicle speed V is not equal to, or greater than, the upper limit vehicle speed VM, the determination in step S83 is NO and the routine returns to step S79.

On the other hand, if the vehicle speed V is equal to, or greater than, the upper limit vehicle speed VM, the determination in step S83 is YES, and the routine proceeds on to step S84, where active vehicle control is cancelled, such that the vehicle is in a state in which neither braking nor acceleration is performed. The routine then returns to step S79.

In addition, with the exemplary embodiment, when the user, i.e., the driver, of the vehicle performs a driving operation while the automatic braking control routine is being executed, execution of the automatic braking control routine is force-terminated in order to give priority to the driving operation by the driver. When the execution of one cycle of the automatic braking control routine ends, the execution of one cycle of the tire protecting program in FIG. 6 also ends.

Figure 10:
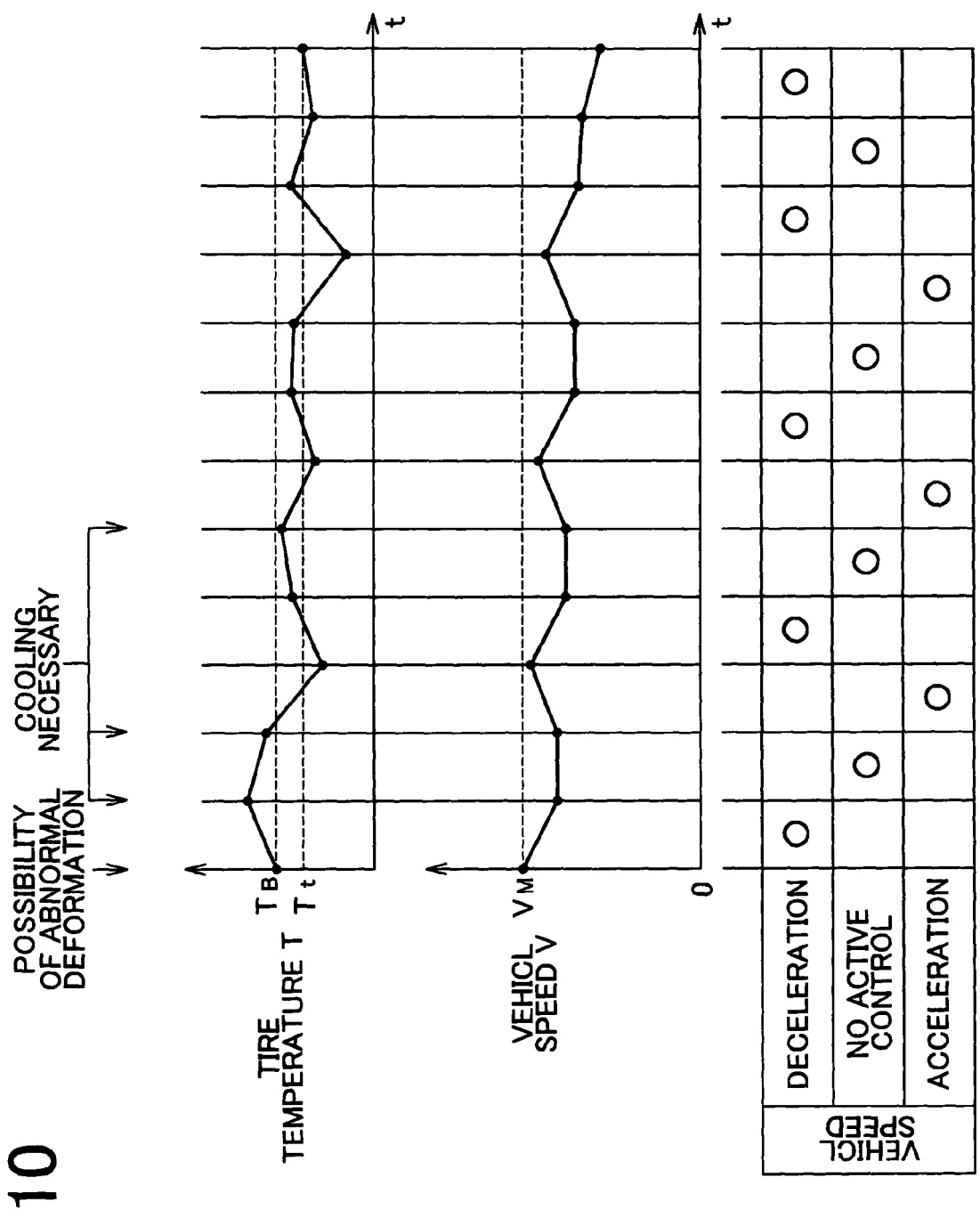
FIG. 10 is a graph explaining one example of a shift over time in a tire temperature T and a vehicle speed V resulting from the execution of the tire protecting program in FIG. 6.

FIG. 10 is a graph showing one example of a shift over time in the tire temperature T and the vehicle speed V resulting from the execution of the automatic braking control routine. In this example, the vehicle is decelerated when it is determined that there is a possibility of abnormal tire deformation. As a result of this deceleration, the tire temperature T increases so the deceleration is cancelled such that the vehicle speed is not actively controlled. Even when the vehicle speed is not actively controlled, the vehicle the tire temperature T is still not below the target temperature Tt so the vehicle is accelerated.

As a result of this acceleration, the tire temperature T decreases to equal to, or less than, the target temperature Tt, so the vehicle is decelerated again. As a result of that deceleration, the tire temperature T increases so the deceleration is cancelled such that the vehicle speed is not actively controlled. Even then, the tire temperature T does not fall below the target temperature Tt so the vehicle is accelerated again. As a result of this acceleration, the tire temperature T decreases to equal to, or less than, the target temperature Tt so the vehicle is decelerated again.

This deceleration results in the tire temperature T rising above the target temperature Tt so the deceleration is then cancelled such that the vehicle speed is not actively controlled again. Even then, the tire temperature T is above the target temperature Tt so the vehicle is accelerated. As a result of that acceleration, the tire temperature T falls below the target Tt so the vehicle is decelerated. As a result of that deceleration, the tire temperature T rises above the target temperature Tt so the deceleration is cancelled such that the vehicle speed is not actively controlled. As a result of the vehicle speed not being actively controlled, the tire temperature T falls below the target temperature Tt so the vehicle is decelerated again.

In addition, there are times when the tire temperature T is temporally maintained substantially constant. At such times, it is estimated that the heating and cooling factors of the tire are balanced and the tire has achieved thermal equilibrium.

Next, a second exemplary embodiment of the invention will be described. In this second exemplary embodiment, the hardware configuration is the same as that in the first exemplary embodiment; only the software configuration is different. Therefore, only the software configuration will be described in detail; a description of the hardware configuration will be omitted.

According to the first exemplary embodiment, the automatic braking controls starts when it is determined that there is a possibility of abnormal tire deformation. Once this automatic braking control starts, it continues until the vehicle stops. While the automatic braking control is being executed, there is a period during which the vehicle speed is maintained and a period during which the vehicle speed is accelerated, depending on the state of the tire itself and the environment around the tire. As a result, the tire temperature T is controlled as much as possible so as not to exceed the critical temperature.

In contrast, according to the second exemplary embodiment, when the tire temperature T drops below the target temperature Tt as a result of the automatic braking control being started when it is determined that there is a possibility of abnormal tire deformation, this drop is regarded as sufficiently reducing the possibility of abnormal tire deformation. In this case, the automatic braking control immediately ends so the vehicle is not necessarily stopped by the automatic braking control.

Figure 11:
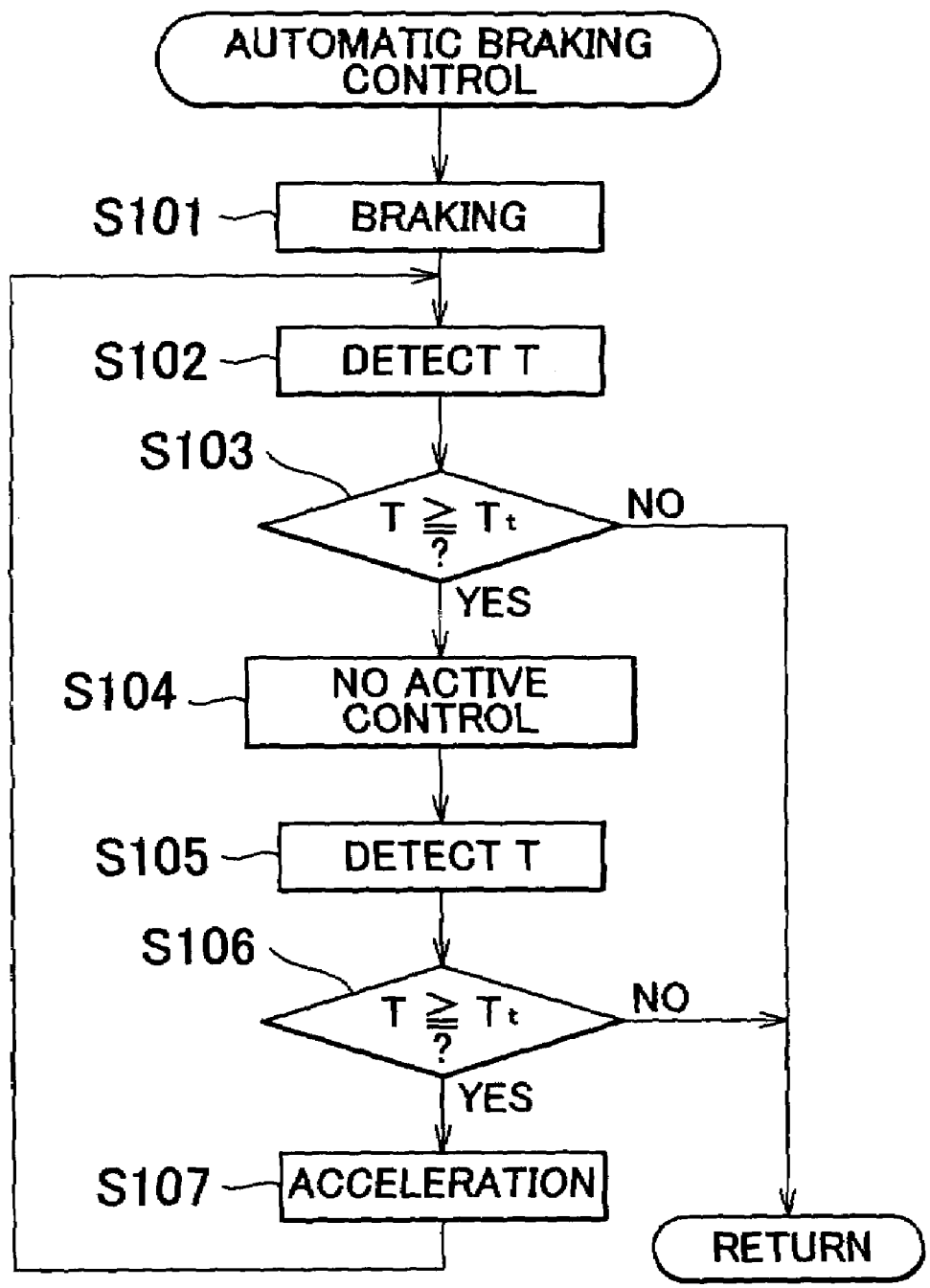
FIG. 11 is a flowchart schematically showing the content of the automatic braking control routine in the tire protecting program executed by the computer 70 of a tire protecting apparatus according to a second exemplary embodiment of the invention.

FIG. 11 is a flowchart schematically showing the content of the automatic braking control routine for performing the automatic braking control according to this kind of mechanism. This automatic braking control routine is used instead of the automatic braking control routine in the first exemplary embodiment. Therefore, all of the steps that are executed for protecting the tire in the second exemplary embodiment are the same as those in the first exemplary embodiment except for the steps in the automatic braking control routine.

As shown in FIG. 11, in the automatic braking control routine according to this exemplary embodiment, the vehicle is first automatically braked by operation of the braking device 60 in step S101. As a result, the vehicle speed is reduced according to the set gradient. Then the current tire temperature T is detected by the tire temperature sensor 22 in step S102.

Continuing, in step S103 it is determined whether the detected tire temperature T is equal to, or greater than, the target temperature Tt, i.e., it is determined whether it is necessary to cool the tire. If the tire temperature T is not equal to, or greater than, the target temperature Tt, the determination in step S103 is NO and execution of that cycle of the automatic braking control routine immediately ends.

On the other hand, if the tire temperature T is equal to, or greater than, the target temperature Tt, the determination in step S103 is YES and the routine proceeds on to step S104, where active vehicle control is cancelled, such that the vehicle is in a state in which neither the braking device 60 nor the driving device 62 is operated. As a result, the vehicle speed is maintained.

Then in step S105 the current tire temperature T is detected again by the tire temperature sensor 22, and in step S106 it is again determined whether the detected tire temperature T is equal to, or greater than, the target temperature Tt, i.e., it is again determined whether it is necessary to cool the tire. If the tire temperature T is not equal to, or greater than, the target temperature Tt, the determination in step S106 is NO and the execution of that cycle of the automatic braking control routine immediately ends.

On the other hand, if the tire temperature T is equal to, or greater than, the target temperature Tt, the determination in step S106 is YES and the routine proceeds on to step S107, where the vehicle is accelerated by operation of the driving device 62. As a result, the vehicle speed increases according to the set gradient. The routine then returns to step S102.

As is clear from the above explanation, in this exemplary embodiment, steps S101 to S107 in FIG. 11 replace steps S71, S74, S75, S78, S79, S80, and S81 in FIG. 9, respectively.

Next, a third exemplary embodiment of the invention will be described. In this third exemplary embodiment, the hardware configuration is the same as that in the first exemplary embodiment; only the software configuration is different. Therefore, only the software configuration will be described in detail; a description of the hardware configuration will be omitted.

In the first exemplary embodiment, the actual temperature T of the tire is successively monitored by the tire temperature sensor 22 while the automatic braking control is being executed. In addition, one mode from among a deceleration mode, a non-active control mode (i.e., a maintaining mode), and an acceleration mode is selected as a mode to control the vehicle speed V based on the results of that monitoring. There is a preset gradient for the vehicle speed V corresponding to each vehicle speed control mode. That is, when a certain vehicle speed control mode is selected, an actual speed gradient $\Delta V$ of the vehicle speed V is primarily determined. In the first exemplary embodiment, the vehicle speed V is controlled according to the selected vehicle speed control mode.

In contrast, according to the third exemplary embodiment, a tire heat balance model simulating a mechanism in which the temperature T of the tire is determined according to the balance of the tire heating and cooling factors is created, and the speed gradient $\Delta V$ while vehicle speed control is being performed is able to be set relatively freely based on that tire heat balance model.

Figure 12:
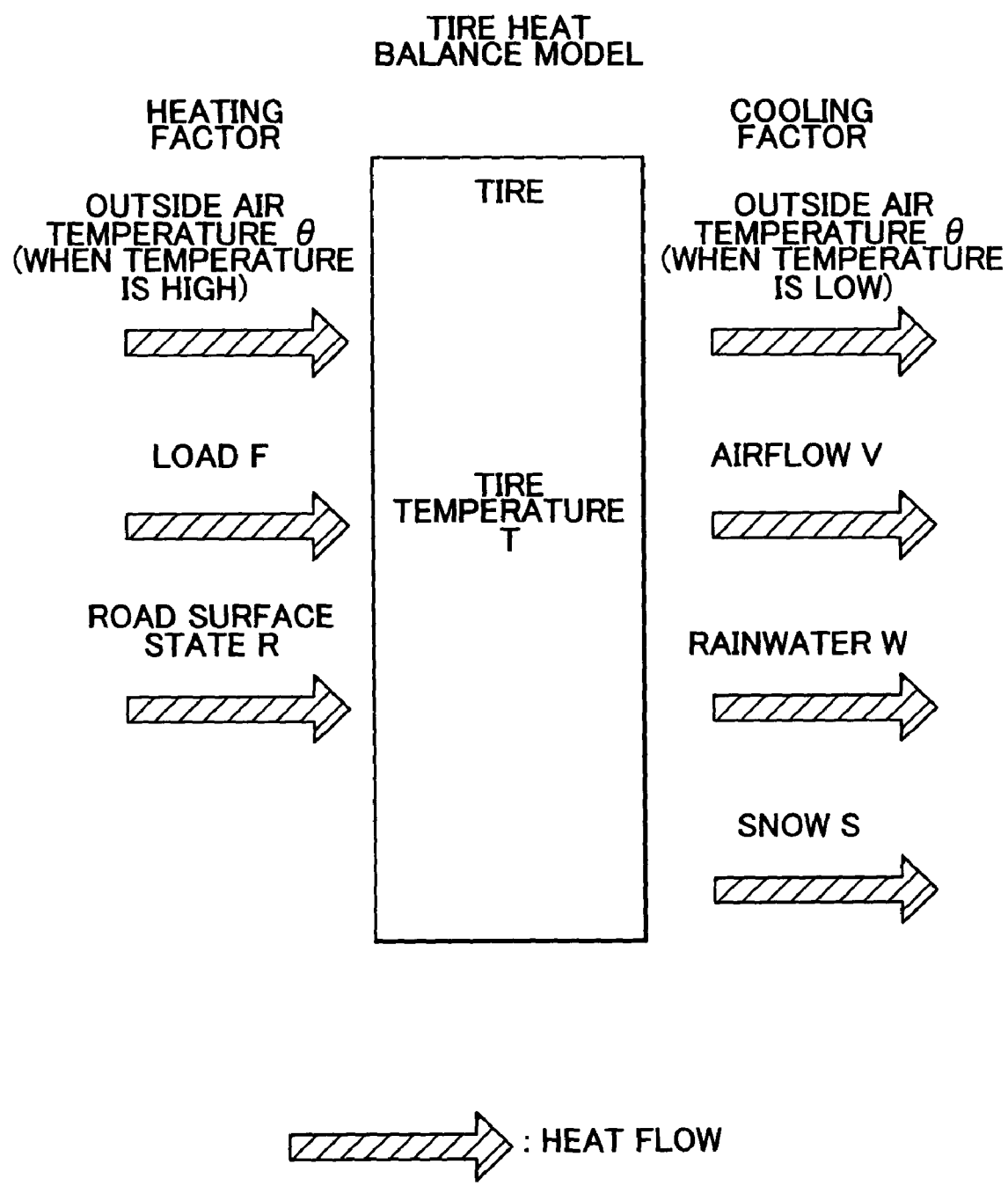
FIG. 12 is a view schematically showing a simulated tire heat balance model created by a tire protecting apparatus according to a third exemplary embodiment of the invention to protect the tire from deforming abnormally.

FIG. 12 is a view schematically showing the tire heat balance model. In this exemplary embodiment, the outside air temperature $\theta$ when the outside air temperature $\theta$ is higher than the tire temperature T, the tire load F, and the road surface state R are considered to be heating factors of the tire. Also, the outside air temperature $\theta$ when the outside air temperature $\theta$ is lower than the tire temperature T, the wind speed of the air flowing around the tire when the vehicle is running (assuming that it matches the vehicle speed V), rainwater W on the road surface, and snow S accumulated on the road surface are considered to be cooling factors of the tire. This is because both the rainwater and the snow on the road surface function as elements that remove heat from the tire, just like the flow of air around the tire.

FIG. 13 is a flowchart schematically showing the content of the tire protecting program according to the third exemplary embodiment of the invention. This tire protecting program is repeatedly executed for each wheel 10 in sequence while power is supplied to the computer 70, just like the tire protecting program in the first exemplary embodiment.

Each time the tire protecting program is executed, the air pressure P of the tire of the wheel for which the program is being executed is first detected by the air pressure sensor 20 in step S131. Next in step S132, the tire temperature T of that tire is detected by the tire temperature sensor 22.

Continuing on, in step S133 it is determined whether there is a possibility of abnormal tire deformation for that tire according to the same determination conditions as in the first exemplary embodiment, based on the detected air pressure P, tire temperature T, and tire temperature gradient $\Delta T$. If there is no possibility of abnormal tire deformation, the determination in step S133 is NO and execution of that cycle of the tire protecting program immediately ends.

On the other hand, if there is a possibility of abnormal tire deformation, the determination in step S133 is YES and the routine proceeds on to step S134. In step S134, the outside air temperature $\theta$ is detected by the outside air temperature sensor 44. Then in step S135 the load F of the tire is detected by the vertical load sensor 46 and in step S136 the road surface state R is detected using the wheel speed sensor 50. This road surface state R is a variable that indicates how good or how rough the current road surface with which the tire is currently in contact is.

Then in step S137, it is determined whether it is raining or whether there is water on the road in the region where the vehicle is currently being driven based on road information received from an outside road traffic information center. The determination results are expressed by the variable rainwater W.

Then in step S138, similar to step S137, it is determined whether it is snowing or whether there is snow on the road in the region where the vehicle is currently being driven based on road information received from the outside road traffic information center. The determination results are expressed by the variable snow S.

Then in step S139, the target speed gradient $\Delta V$ (either the target control quantity or the target acceleration or deceleration rate) for when the vehicle speed is to be automatically controlled is determined based on each of the detected physical quantities.

This target speed gradient $\Delta V$ can be determined using, for example, a function $f1(T)$ in which the tire temperature T is a variable, a function $f2(\theta, F, R)$ in which each of the outside air temperature $\theta$, the load F, and the road surface state R, are all variables, and a function $g(\theta, V, W, S)$ in which the outside air temperature $\theta$, the vehicle speed V, the rainwater W, and the snow S are all variables.

Figure 14A:
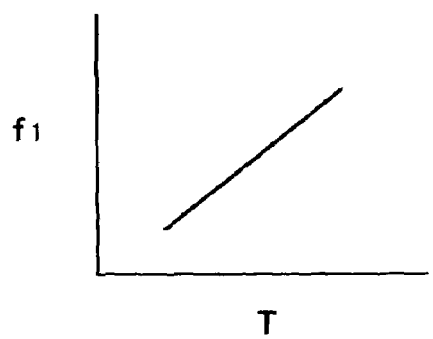
FIGS. 14a, 14b, and 14c are graphs explaining the content of the execution of step S139 in FIG. 13.
Figure 14B:
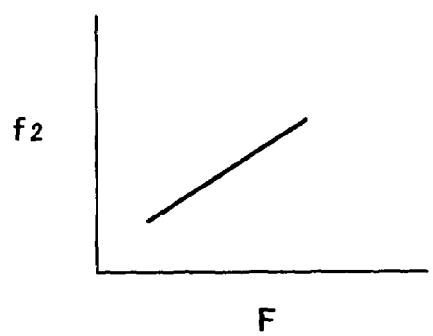
Figure 14C:
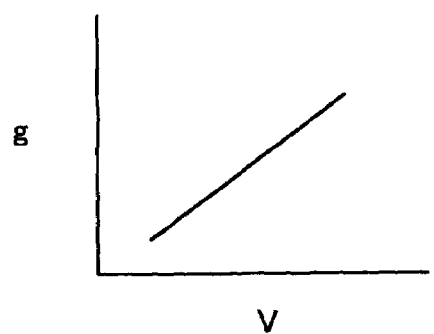

FIG. 14a is a graph schematically illustrating one example of the change characteristics of function $f1(T)$ with respect to the tire temperature T. FIG. 14b is a graph schematically illustrating one example of the change characteristics of function $f2(\theta, F, R)$ with respect to the load F. FIG. 14c is a graph schematically illustrating one example of the change characteristics of function $g(\theta, V, W, S)$ with respect to the vehicle speed V.

Further, by using a default K, for example, the target speed gradient $\Delta V$ can be determined using the expression $$\Delta V = K - f1(T) - f2(\theta, F, R) + g(\theta, V, W, S)$$

or the expression $$\Delta V = K + f1(T) + f2(\theta, F, R) - g(\theta, V, W, S).$$

When the target speed gradient $\Delta V$ is determined by executing step S139, it is then determined in step S140 whether that determined target speed gradient ΔV is a negative value, 0, or a positive value.

If the target speed gradient ΔV is a negative value, the braking device 60 is operated so as to reduce the vehicle speed V according to that target speed gradient ΔV in step S141. On the other hand, if the target speed gradient ΔV is 0, neither the braking device 60 nor the driving device 62 is operated such that the vehicle speed V is maintained in step S142. Also, if the target speed gradient ΔV is a positive value, the driving device 62 is operated so as to increase the vehicle speed V according to that target speed gradient ΔV in step S143. In any case, this ends the execution of one cycle of the tire protecting program.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A tire protecting apparatus for a vehicle, comprising:
    a temperature sensor that detects a temperature of a tire; and
    a controller that:
        receives the temperature of the tire from the temperature sensor;
        determines whether it is necessary to cool the tire based on the received temperature of the tire; and
        if it is necessary to cool the tire, controls the speed of the vehicle such that a cooling effect on the tire from a flow of air around the tire does not diminish.

2. The tire protecting apparatus according to claim 1, wherein the speed of the vehicle is controlled by controlling an engine of the vehicle.

3. The tire protecting apparatus according to claim 1, wherein the controller:
    determines a reference temperature, the reference temperature determined based on at least one of a heating factor that heats the tire and the cooling effect on the tire; and
    determines whether it is necessary to cool the tire based on a relationship between the reference temperature and the received temperature of the tire.

4. The tire protecting apparatus according to claim 1, wherein the controller:
    determines a reference temperature, the reference temperature determined based on at least one of a heating factor that heats the tire and the cooling effect on the tire; and
    determines that it is necessary to cool the tire when the received temperature of the tire has exceeded or is about to exceed the reference temperature.

5. The tire protecting apparatus according to claim 1, further comprising:
    a warning device which warns a user of the vehicle when the controller has determined that it is necessary to cool the tire.

6. The tire protecting apparatus according to claim 1, wherein the controller:
    controls the vehicle such that the tire load acting on the tire is reduced based on the received temperature of the tire.

7. The tire protecting apparatus according to claim 1, wherein the controller:
    determines the reference temperature based on at least one of a heating factor that heats the tire and the cooling effect on the tire; and
    determines that it is necessary to cool the tire when the received temperature of the tire has exceeded or is about to exceed the determined reference temperature.

8. The tire protecting apparatus according to claim 1, further comprising:
    an air pressure sensor which detects an air pressure of the tire;
    wherein the controller:
        determines whether there is a possibility of abnormal tire deformation based on at least one of the air pressure detected by the air pressure sensor and a change gradient of that air pressure, and at least one of the temperature of the tire and a change gradient of that tire temperature.

9. The tire protecting apparatus according to claim 1, wherein the controller automatically controls the vehicle speed to cool the tire.

10. The tire protecting apparatus according to claim 3, wherein, when a temperature of air outside of the vehicle is higher than the received tire temperature, the heating factor includes at least one of that outside air temperature, a tire load acting on the tire, and a state of a road surface with which the tire makes contact.

11. The tire protecting apparatus according to claim 3, wherein, when a temperature of the air outside the vehicle is lower than the received temperature of the tire, the controller determines whether it is necessary to cool the tire based an additional cooling factor, the additional cooling factor including at least one of:
    that outside air temperature; and
    a temperature of an object contacting to the tire, if the temperature of the object is lower than the received temperature of the tire.

12. The tire protecting apparatus according to claim 10, wherein the tire load includes at least one of a load acting on the tire and a rotational speed of the tire.

13. The tire protecting apparatus according to claim 12, wherein the tire load includes at least one of a vertical load, a longitudinal force, and a side force acting on the tire.

14. The tire protecting apparatus according to claim 4, wherein the controller:
    determines that there is a possibility that abnormal tire deformation will occur if the received temperature of the tire exceeds a preset critical temperature, the preset critical temperature being a temperature that the tire should not exceed to prevent abnormal tire deformation; and
    determines the reference temperature based on the critical temperature and at least one of the heating factor and the cooling effect on the tire.

15. The tire protecting apparatus according to claim 6, the controller:
    reduces the tire load by decelerating the vehicle; and
    stops deceleration of the vehicle when it is necessary to cool the tire after decelerating the vehicle.

16. A tire protecting apparatus for a vehicle, comprising:
    a tire temperature sensor that detects the temperature of the tire; and
    a controller that:
    receives the temperature of the tire from the temperature sensor;
        controls a vehicle speed of the vehicle based on the received temperature of the tire;

determines a target temperature of the tire based on both of a heating factor that heats the tire and a cooling effect on the tire from a flow of air around the tire; and controls the vehicle speed such that the temperature of the tire approaches the target temperature;

wherein the cooling effect on the tire does not diminish when it has been determined that it is necessary to cool the tire.

17. The tire protecting apparatus according to claim 16, wherein the controller controls the vehicle speed such that the vehicle speed is gradually reduced following an interval during which the vehicle speed is not actively controlled.

18. The tire protecting apparatus according to claim 16, wherein the controller:

determines the target temperature based on a critical temperature that the tire should not exceed in order to prevent abnormal tire deformation and at least one of the heating factor and the cooling effect on the tire; and controls the vehicle speed such that the received temperature of the tire approaches the target temperature.

19. The tire protecting apparatus according to claim 16, wherein the controller:

determines a target speed gradient of the vehicle speed based on at least one of the heating factor that heats the tire and the cooling effect on the tire; and controls the vehicle speed according to the determined target speed gradient.

20. The tire protecting apparatus according to claim 16, wherein the controller automatically controls the vehicle speed to cool the tire.

21. The tire protecting apparatus according to claim 18, wherein the controller determines the target temperature based on the critical temperature and the heating factor, the target temperature being less than the critical temperature.

22. The tire protecting apparatus according to claim 18, wherein the controller controls the vehicle speed such that an actual temperature of the tire approaches the target temperature by successively detecting and feeding back the received temperature of the tire, and thereby controls the actual temperature of the tire so as not to exceed the critical temperature.

23. A tire protecting apparatus for a vehicle, comprising:

a tire temperature sensor that detects a temperature of the tire; and a controller that:

receives the temperature of the tire;

determines whether it is necessary to cool the tire based on the received temperature of the tire;

decelerates the vehicle when it has been determined that there is a possibility of abnormal tire deformation occurring; and stops deceleration of the vehicle when it has been determined that it is necessary to cool the tire during deceleration of the vehicle.

* * * * *